(12) United States Patent
Bellagamba et al.

(10) Patent No.: US 8,923,295 B2
(45) Date of Patent: Dec. 30, 2014

(54) METHODS AND DEVICES FOR POINT TO MULTIPOINT TRAFFIC PATH ENCODING

(75) Inventors: Elisa Bellagamba, Stockholm (SE); Benoit Tremblay, Laval (CA); Richard Tremblay, Rosemere (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 485 days.

(21) Appl. No.: 13/260,941

(22) PCT Filed: Mar. 31, 2009

(86) PCT No.: PCT/SE2009/050338
§ 371 (c)(1),
(2), (4) Date: Nov. 3, 2011

(87) PCT Pub. No.: WO2010/114437
PCT Pub. Date: Oct. 7, 2010

(65) Prior Publication Data
US 2012/0044936 A1    Feb. 23, 2012

(51) Int. Cl.
*H04L 12/00* (2006.01)

(52) U.S. Cl.
USPC .................................................. 370/392

(58) Field of Classification Search
CPC ....................................................... H04L 12/56
See application file for complete search history.

(56) References Cited

U.S. PATENT DOCUMENTS

2007/0280117 A1* 12/2007 Katz et al. ............... 370/238

FOREIGN PATENT DOCUMENTS

| EP | 1 775 892 A1 | 4/2007 |
|---|---|---|
| JP | 2005-167482 | 6/2005 |
| JP | 2007-214899 | 8/2007 |

OTHER PUBLICATIONS

Extended European Search Report, EP 09842774.3, Sep. 12, 2013, 4 pages.
Aggarwal R. et al., "Extensions to Resource Reservation Protocol—Traffic Engineering (RSVP-TE) for Point-to-Multipoint TE Label Switched Paths (LSPs); rfc4875.txt," May 1, 2007, 54 pages.
Written Opinion of the International Searching Authority, PCT/SE2009/050338, Dec. 17, 2009.
International Search Report, PCT/SE2009/050338, Dec. 17, 2009.
Martinez-Yelmo et al., "Multicast Traffic Aggregation in MPLS-Based VPN Networks," IEEE Communications Magazine, Oct. 2007, pp. 78-85.
Chaitou et al., Multi-Point to Multi-Point Traffic Engineering, Orange Labs, 2008 IEEE, 9 pages.

* cited by examiner

*Primary Examiner* — Sulaiman Nooristany
(74) *Attorney, Agent, or Firm* — Myers Bigel Sibley & Sajovec

(57) ABSTRACT

The present invention relates to network nodes and methods that use an encoding scheme for encoding a point-to-multipoint traffic path from one ingress node to a plurality of egress nodes in, for example, a Multi-Protocol Label Switching network. According to the encoding scheme a so-called common ERO is used. The common ERO specifies a list consisting of nodes that are common to several sub paths in order to provide a compression mechanism that reduces the size of path messages that are used for signaling the point-to-multipoint traffic path.

8 Claims, 7 Drawing Sheets

METHODS AND DEVICES FOR POINT TO MULTIPOINT TRAFFIC PATH ENCODING

CROSS-REFERENCE TO RELATED APPLICATIONS

This application is a 35 U.S.C. §371 national stage application of PCT International Application No. PCT/SE2009/050338, filed on Mar. 31, 2009, the disclosure and content of which is incorporated by reference herein as if set forth in its entirety. The above-referenced PCT International Application was published in the English language as International Publication No. WO 2010/114437 on Oct. 7, 2010.

FIELD

The present invention relates to methods and arrangements to be used in connection with signaling of point-to-multipoint traffic paths and more particularly to the encoding of such traffic paths.

BACKGROUND

In Label Switching networks, such as Multi-Protocol Label Switching (MPLS) networks Label Switched Paths (LSPs) are established to route traffic along specified paths through the network. An LSP is established by means of signaling using path messages that are distributed to the Label Switched Routers (LSRs) along the LSP.

It is possible to set up point-to-point LSPs between one ingress LSR and one egress LSR as well as point-to-multipoint (P2MP) LSPs between one ingress LSR and a plurality of egress LSRs. P2MP LSPs may e.g. be used for multicasting in the case of an IP-TV application. A P2MP LSP is comprised of multiple source-to-leaf (S2L) sub-LSPs. These S2L sub-LSPs are set up between the ingress and egress LSRs and are appropriately combined by means of propagating path messages that encodes the P2MP LSP to all the branches of connected LSRs that form the P2MP LSP.

There are known mechanisms and semantics that have been developed for setting up LSPs. The IETF RFC 3209 "RSVP-TE: Extensions to RSVP for LSP Tunnel", December 2001 defines a mechanism for setting up P2P Traffic Engineered LSPs in Multi-Protocol Label Switching (MPLS) networks. The IETF RFC 3473 "Generalized Multi-Protocol Label Switching (GMPLS) Signaling Resource ReserVation Protocol-Traffic Engineering (RSVP-TE) Extensions", January 2003, defines extensions to the above mentioned RFC 3209 for setting up P2P TE LSPs in Generalized MPLS (GMPLS) networks. However these specifications do not provide a mechanism for building point-to-multipoint (P2MP) TE LSPs.

The IETF RFC 4875 "Extensions to Resource Reservation Protocol-Traffic Engineering (RSVP-TE) for Point-to-Multipoint TE Label Switched Paths (LSPs)", May 2007, defines extensions to the RSVP-TE protocol described in the above RFC 3209 and RFC 3473 to support P2MP TE LSPs satisfying the set of requirements described in the IETF RFC4461 "Signaling Requirements for Point-to-Multipoint Traffic-Engineered MPLS Label Switched Paths (LSPs)", April 2006. The RFC 4875 relies on the semantics of the Resource Reservation Protocol (RSVP) that RSVP-TE inherits for building P2MP LSPs.

The RFC 4875 describes a compression mechanism for encoding a P2MP LSP that is based on explicit encoding of one S2L sub-LSP. For other S2L sub-LSPs of the P2MP LSP only the path from a branch LSR to the egress LSR of that S2L sub-LSP is explicitly encoded. Thus by means of this compression mechanism extra processing that can result if explicit routes are encoded from ingress to egress for each S2L sub-LSP is reduced and the sizes of Path messages is also reduced.

However, setting up P2MP LSPs with complex topologies still requires a very large number of bytes of signalling information. There is therefore a need for methods and arrangements that are able to set up P2MP LSPs more efficiently than the methods and arrangements according to prior art.

SUMMARY

An object of the present invention is to provide methods and arrangements that allow for set-up of point-to-multipoint traffic paths in e.g. Multi-Protocol Label Switching networks by means of an encoding scheme that is an alternative to encoding schemes according to prior art.

The above stated object is achieved by means of methods and network nodes according to the independent claims.

A first embodiment of the present invention provides a method in a first network node for signaling a point-to-multipoint traffic path from one ingress node to a plurality of egress nodes in a network. The traffic path includes a plurality of source-to-leaf sub paths. Each source-to-leaf sub path is set up between the ingress node and an egress node. The method comprises a step of encoding the point-to-multipoint traffic path using an encoding scheme to produce a number of path descriptors. This encoding scheme includes a step of producing a common explicit route object as one path descriptor. The common explicit route object specifies a list consisting of nodes. The nodes in this list are nodes that are downlink from the first network node and which are nodes that every source-to-leaf sub path, traversing a second network node and belonging to the point-to-multipoint traffic path, should traverse. The method also comprises a step of including the number of path descriptors in a path message and a step of sending the path message to the second network node to enable routing of traffic according to the point-to-multipoint traffic path.

A second embodiment of the present invention provides a first network node, which is adapted to signal a point-to-multipoint traffic path from one ingress node to a plurality of egress nodes in a network. The traffic path includes a plurality of source-to-leaf sub paths. Each source-to-leaf sub path is set up between the ingress node and an egress node. The network node comprises a processor unit. The processor unit is adapted to encode the point-to-multipoint traffic path using an encoding scheme to produce a number of path descriptors. This encoding scheme is adapted to produce a common explicit route object as one path descriptor. The common explicit route object specifies a list consisting of nodes. The nodes in this list are nodes that are downlink from the first network node and which are nodes that every source-to-leaf sub path, traversing a second network node and belonging to the point-to-multipoint traffic path, should traverse. The processor unit is also adapted to include the number of path descriptors in a path message. The network node further comprises an output unit, which is adapted to send the path message the second network node to enable routing of traffic according to the point-to-multipoint traffic path.

A third embodiment of the present invention provides a method in a network node for establishing routing of traffic according to a point-to-multipoint traffic path from one ingress node to a plurality of egress nodes in a network. The traffic path includes a plurality of source-to-leaf sub paths. Each source-to-leaf sub path is set up between the ingress node and an egress node. According to a step in the method a path message is received. The path message includes signaling information encoding the point-to-multipoint traffic path. The method also comprises a step of processing the path message to determine if any further path messages should be created and forwarded to another network node to enable routing of traffic according to the point-to-multipoint traffic path. This processing step includes interpreting a common explicit route object in the path message. The common explicit route object specifies a list consisting of nodes. The nodes in this list are nodes that are downlink from the network node and which are nodes that every source-to-leaf sub path, traversing the network node and belonging to the point-to-multipoint traffic path, should traverse.

A fourth embodiment of the present invention provides a network node for establishing routing of traffic according to a point-to-multipoint traffic path from one ingress node to a plurality of egress nodes in a network. The traffic path includes a plurality of source-to-leaf sub paths. Each source-to-leaf sub path is set up between the ingress node and an egress node. The network node comprises an input unit that is adapted to receive a path message. The path message includes signaling information encoding the point-to-multipoint traffic path. The network node also comprises a processor unit which is adapted to process the path message to determine if any further path messages should be created and forwarded to another network node to enable routing of traffic according to the point-to-multipoint traffic path. The processor unit is further adapted to interpret a common explicit route object in the path message. The common explicit route object specifies a list consisting of nodes. The nodes in this list are nodes that are downlink from the network node and which are nodes that every source-to-leaf sub path, traversing the network node and belonging to the point-to-multipoint traffic path, should traverse.

An advantage of embodiments of the present invention is that they make it possible to encode point-to-multipoint traffic paths by means listing fewer network nodes in path messages. Thus the sizes of path messages can be reduced and a saving in the amount of signalling can be achieved.

Another advantage of embodiments of the present invention is that the amount of signalling space saved is related to the topology deployed. The more complex the topology of the point-to-multipoint traffic path is, the higher the space saved. However, the amount of signalling required using the encoding scheme according to embodiments of the present invention is always less than that required when the encoding scheme according to the RFC 4875 is used.

A further advantage of the encoding scheme according to embodiments of the present invention is that it does not introduce any further computational cost compared to the encoding scheme proposed in RFC 4875. Concluding, embodiments of the present invention provide an encoding scheme that is cost efficient without penalizing the computational complexity or other cost related aspects. The present invention provides methods and network nodes in which this encoding scheme can be used.

Further advantages and features of embodiments of the present invention will become apparent when reading the following detailed description in conjunction with the drawings.

DETAILED DESCRIPTION

Figure 1:
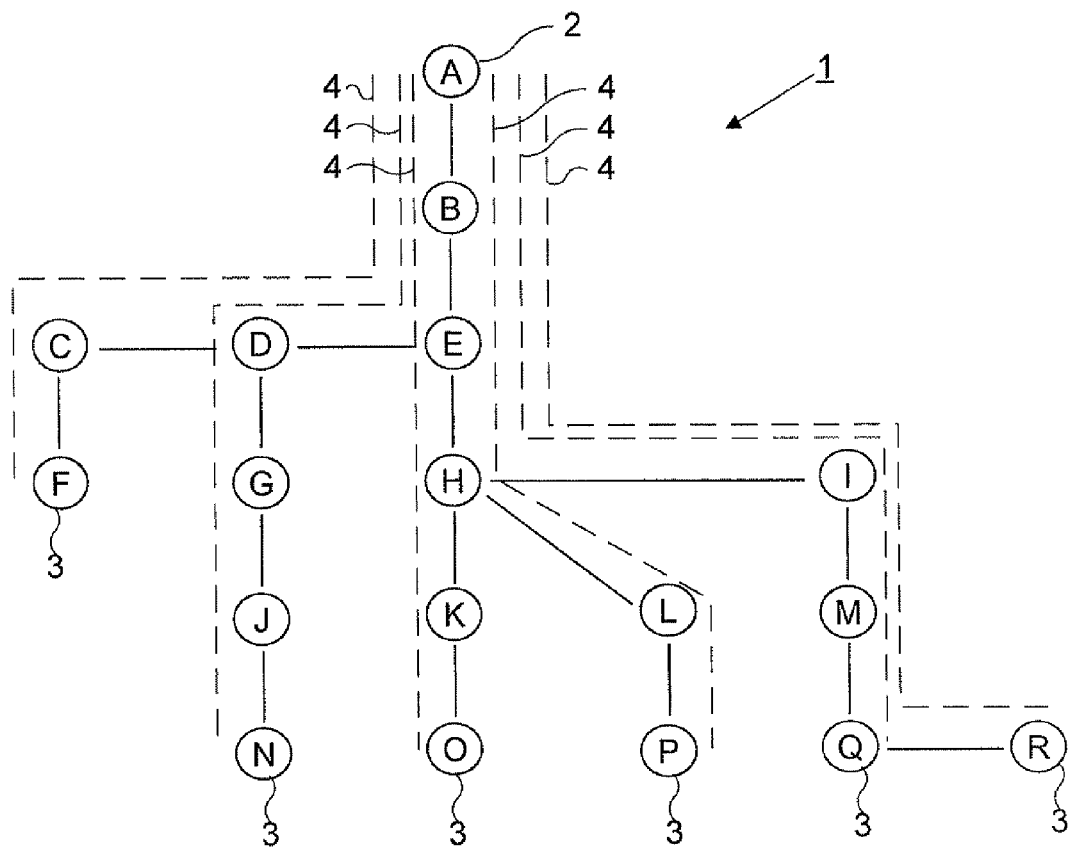
FIG. 1 is a schematic block diagram illustrating a topology of a point-to-multipoint traffic path which can be encoded according to embodiments of the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements.

In order to provide a better understanding of the present invention and its benefits the prior art solution described in the above mentioned IETF RFC 4875 "Extensions to Resource Reservation Protocol-Traffic Engineering (RSVP-TE) for Point-to-Multipoint TE Label Switched Paths (LSPs)", May 2007 will first be explained with respect to a point-to-multipoint (P2MP) Label Switched Path (LSP) topology shown in FIG. 1 and a schematically illustrated path message shown in FIG. 2. Then embodiments of the present invention will be described with respect to the same P2MP LSP topology of FIG. 1 and a schematically illustrated path message shown in FIG. 3. Thereby the explanation of differences and advantages over prior art will be facilitated.

In the solution according to RFC 4875 point-to-multipoint LSPs can be established by allowing non-ingress nodes in the network to be replication/branch nodes. A branch node is a LSR that replicates the incoming data on to one or more outgoing interfaces. The solution according to RFC 4875 relies on RSVP-TE in the network for setting up a P2MP TE LSP. The P2MP TE LSP is set up by associating multiple S2L sub-LSPs and relying on data replication at branch nodes.

The P2MP LSP is signalled using Path messages that are propagated to the LSRs in the P2MP tree. When a Path message signals a single S2L sub-LSP (that is, the Path message is only targeting a single leaf in the P2MP tree), an EXPLICIT_ROUTE object (ERO) encodes the path to the egress LSR. The Path message also includes a S2L_SUB_LSP object for the S2L sub-LSP being signalled. The <[<EXPLICIT_ROUTE>], <S2L_SUB_LSP>> tuple represents the S2L sub-LSP and is referred to as the sub-LSP descriptor.

When a Path message signals multiple S2L sub-LSPs, the path of the first S2L sub-LSP to the egress LSR is encoded in the ERO according to the solution in RFC 4875. The first S2L sub-LSP is the one that corresponds to the first S2L_SUB_LSP object in the Path message. The S2L sub-LSPs corresponding to the S2L_SUB_LSP objects that follow are termed as subsequent S2L sub-LSPs and the path of each subsequent S2L sub-LSP is encoded in a P2MP_SECONDARY_EXPLICIT_ROUTE object (SERO). The format of the SERO is the same as an ERO which means that each subsequent S2L sub-LSP is represented by tuples of the form <[<P2MP SECONDARY_EXPLICIT_ROUTE>], <S2L_SUB_LSP>>. According to RFC 4875 a SERO for a particular S2L sub-LSP includes only the path from a branch LSR to the egress LSR of that S2L sub-LSP in a manner that will be explained in further detail below. A branch must according to RFC 4875 appear as an explicit hop in the ERO or some other SERO.

The Path Message composition is described in RFC 4875 as follows:

```
<Path Message> ::= <Common Header> [<INTEGRITY>]
    [[<MESSAGE_ID_ACK> | <MESSAGE_ID_NACK>] ...]
    [<MESSAGE_ID>]
    <SESSION> <RSVP_HOP>
    <TIME_VALUES>
    [<EXPLICIT_ROUTE>]
    <LABEL_REQUEST>
    [<PROTECTION>]
    [<LABEL_SET> ... ]
    [<SESSION_ATTRIBUTE>]
    [<NOTIFY_REQUEST>]
    [<ADMIN_STATUS>]
    [<POLICY_DATA> ... ]
    <sender descriptor>
    [<S2L sub-LSP descriptor list>]
```

The following is the format of the S2L sub-LSP descriptor list:

```
<S2L sub-LSP descriptor list> ::= <S2L sub-LSP descriptor>
    [<S2L sub-LSP descriptor list>]
<S2L sub-LSP descriptor> ::= <S2L_SUB_LSP>
    [<P2MP SECONDARY_EXPLICIT_ROUTE>]
```

According to the RFC 4875 the first S2L_SUB_LSP object is a special case, and its explicit route is specified by the ERO. Therefore, the first should not, according to the solution in the RFC 4875 be followed by, a SERO.

The encoding of the ERO, SERO and S2L_SUB_LSP object is described in detail in the RFC 4875. The S2L_SUB_LSP object includes the destination address of the S2L sub-LSP destination which e.g. can be an IPv4 or IPv6 address. According to the solution in RFC 4875 the ERO and SERO includes a list of network addresses to LSRs along a S2L sub-LSP including the destination address of that S2L sub-LSP.

In order to reduce repetition of path information for parts of S2L sub-LSPs that share hops RFC 4875 describe an algorithm in which this information is deduced from the explicit routes of other S2L sub-LSPs using explicit route compression in SEROs in a way that will be apparent from the example described below.

Now consider the exemplary P2MP LSP topology schematically illustrated in FIG. 1, which shows a P2MP LSP 1 with LSR A as the ingress LSR 2 and six egress LSRs 3: F, N, O, P, Q and R. Thus the P2MP LSP 1 is composed of six S2L sub-LSPs 4 which are schematically illustrated with dashed lines. When the six S2L sub_LSPs 4 are signalled in one Path message, assuming that the S2L sub-LSP to LSR F is the first S2L sub-LSP, the ingress LSR A could use the following encoding according to the compression technique described in RFC 4875 for creating a Path message to LSR B:

S2L sub-LSP-F: ERO={B, E, D, C, F}, <S2L_SUB_LSP> object-F

S2L sub-LSP-N: SERO={D, G, J, N}, <S2L_SUB_LSP> object-N

S2L sub-LSP-O: SERO={E, H, K, O}, <S2L_SUB_LSP> object-O

S2L sub-LSP-P: SERO={H, L, P}, <S2L_SUB_LSP> object-P

S2L sub-LSP-Q: SERO={H, I, M, Q}, <S2L_SUB_LSP> object-Q

S2L sub-LSP-R: SERO={Q, R}, <S2L_SUB_LSP> object-R

The LSR B would then process the Path message from LSR A and create a new Path message for LSR E based on the received Path message by simply removing its own network address from the list of LSRs in the ERO.

The LSR E is a branch LSR. After LSR E processes the incoming Path message from LSR B it sends a Path message to LSR D with the S2L sub-LSP explicit routes encoded as follows:

S2L sub-LSP-F: ERO={D, C, F}, <S2L_SUB_LSP> object-F

S2L sub-LSP-N: SERO={D, G, J, N}, <S2L_SUB_LSP> object-N

LSR E also sends a Path message to LSR H, as follows:

S2L sub-LSP-O: ERO={H, K, O}, <S2L_SUB_LSP> object-O

S2L sub-LSP-P: SERO={H, L, P}, S2L_SUB_LSP object-P

S2L sub-LSP-Q: SERO={H, I, M, Q}, <S2L_SUB_LSP> object-Q

S2L sub-LSP-R: SERO={Q, R}, <S2L_SUB_LSP> object-R

After LSR H processes the incoming Path message from E, it sends a Path message to LSR K, LSR L, and LSR I. The encoding for the Path message to LSR K is as follows:

S2L sub-LSP-O: ERO={K, O}, <S2L_SUB_LSP> object-O

The encoding of the Path message sent by LSR H to LSR L is as follows:

S2L sub-LSP-P: ERO={L, P}, <S2L_SUB_LSP>object-P

The encoding of the Path message sent by LSR H to LSR I is as follows:

S2L sub-LSP-Q: ERO={I, M, Q}, <S2L_SUB_LSP> object-Q

S2L sub-LSP-R: SERO={Q, R}, <S2L_SUB_LSP> object-R

Path messages are then continued to be propagated to all the LSRs of the P2MP LSP 1 according to the same principles as described above.

The above described algorithm provides compression of the list of addresses in the S2L descriptors but the Path messages can still be very large with in case of complicated path topologies. Embodiments of the present invention provide a solution that can even further reduce the redundancy of Path messages by means of avoiding repeating the same addresses in different descriptors to a greater extent than with the above described prior art solution.

According to embodiments of the present invention it is possible to reduce the sizes of path messages and thus the amount of signalling required for routing, by reducing the list of nodes in the SEROs lists. This is achieved by preventing the repetition of the initial common sequence of addresses. Embodiments of the present invention introduces a so called common Explicit Route Object (common ERO) which is used to list the nodes that are common to sub paths of a sub tree as will become apparent from the detailed description of an embodiment of the present invention below.

Consider again the P2MP LSP 1 with the topology illustrated in FIG. 1. A way of encoding and signalling the S2L sub-LSPs 4 according to an embodiment of the present invention will now be described.

Although the nodes A-R illustrated in FIG. 1 were said to be Label Switched Routers (LSRs) and the illustrated topology was that of a Label Switched Path it is foreseen that embodiments of the present invention can be applied with other types of networks and nodes than those according to today's standards for Label Switching techniques. Therefore more general terms such as "node" or "network node" will also be used to refer to nodes A-R. More general terms such as "P2MP traffic path", "traffic path" and "sub path" will also be used, and it is to be understood that the corresponding more specific terms "P2MP LSP", "LSP" and "sub-LSP" are examples according to specific embodiments of the present invention.

From FIG. 1 it can be noticed that all S2L sub paths 4 traverse the nodes A, B and E. Furthermore, when considering sub trees it can be noticed that several sub paths have several of the nodes in common. According the embodiment of the present invention nodes that are common to all sub paths that traverses the node to which a path message is sent are encoded in the common ERO. By introducing the common ERO it is not necessary for the following SEROs to repeat any of the nodes listed in the common ERO.

Thus the encoding according to the embodiment of the present invention is the following:

Node A can encode the S2L sub path explicit routes using compression according to the embodiment of the present invention in a path message to node B like this:
Common ERO: ERO={B, E}
S2L sub-LSP-F: SERO={D, C, F}, <S2L_SUB_LSP> object-F
S2L sub-LSP-N: SERO={D, G, J, N}, <S2L_SUB_LSP> object-N
S2L sub-LSP-O: SERO={H, K, O}, <S2L_SUB_LSP> object-O
S2L sub-LSP-P: SERO={H, L, P}, <S2L_SUB_LSP> object-P
S2L sub-LSP-Q: SERO={H, I, M, Q}, <S2L_SUB_LSP> object-Q
S2L sub-LSP-R: SERO={Q, R}, <S2L_SUB_LSP> object-R Note that compared to the corresponding encoding according to prior art described above, the encoding according to the embodiment of the present invention would result in a path message with one additional SERO, but some of the SEROs are shorter than according to prior art. This saving of SERO size will accumulate in the further path messages that are propagated down the path tree.

Now continuing the description of encoding of path messages for the P2MP traffic path 1, the node B would process the path message from node A and create a new path message for node E based on the received path message by simply removing its own network address from the list of nodes in the common ERO.

The node E is a branch node. After node E processes the incoming path message from node B it sends a path message to node D with the S2L sub-path explicit routes encoded as follows:
Common ERO: ERO={D}
S2L sub-LSP-F: SERO={C, F}, <S2L_SUB_LSP> object-F
S2L sub-LSP-N: SERO={G, J, N}, <S2L_SUB_LSP> object-N Note that compared to the corresponding path message according to prior art, the network address of node D is not repeated according to the encoding above.

Node E also sends a path message to node H:
Common ERO: ERO={H}
S2L sub-LSP-O: SERO={K, O}, <S2L_SUB_LSP> object-O
S2L sub-LSP-P: SERO={L, P}, S2L_SUB_LSP object-P
S2L sub-LSP-Q: SERO={I, M, Q}, <S2L_SUB_LSP> object-Q
S2L sub-LSP-R: SERO={Q, R}, <S2L_SUB_LSP> object-R For the above encoding, the network address of node H is not repeated in the path message.

After node H processes the incoming path message from node E, it sends a path message to node K, node L, and node I.

The encoding for the path message to node K is as follows:
S2L sub-LSP-O: ERO={K, O}, <S2L_SUB_LSP> object-O The encoding of the path message sent by node H to node L is as follows:
S2L sub-LSP-P: ERO={L, P}, <S2L_SUB_LSP> object-P The following is the encoding that the node H use to encode the S2L sub path explicit routes in a path message sent to node I:
S2L sub-LSP-Q and Common ERO: ERO={I, M, Q}, <S2L_SUB_LSP> object-Q
S2L sub-LSP-R: SERO={R}, <S2L_SUB_LSP> object-R The encoding above saves one repetition of the network address of node Q compared to the prior art encoding solution. In total, for this embodiment of the present invention, 45 network addresses of nodes were used for the encoding instead of the 50 according to the above described encoding according to prior art.

From the exemplary embodiment of the present invention described above it is clear that the common ERO is introduced in the path messages. The common ERO specifies a list of so called common nodes. The node or nodes that are viewed as common nodes and therefore is/are to be included in the common ERO will depend on the node in the P2MP path that sends the path message in which the common ERO is included and also on the node that is to receive the path message with the common ERO. The common nodes are those nodes, downlink from the sending node, which every S2L sub path, traversing the receiving node, should traverse. The introduction of the common ERO comes at a cost in terms of added bytes of information but this cost is outbalanced by the saving that can be done in other sub path descriptors since their lists of nodes can be shortened compared to prior art solutions. The common ERO according to embodiments of the present invention does not necessarily identify a source-to-leaf path since it does not always list an egress node. In such cases where the common ERO does not list an egress node, the S2L_SUB_LSP object may be removed compared with the <[<EXPLICIT_ROUTE>], <S2L_SUB_LSP>> sub-LSP descriptor tuple. Therefore it is possible that the common ERO will not include any indication of the path destination. In the particular cases that a common ERO indentifies at the same time also a source-to-leaf path, the S2L_SUB_LSP object is used in the tuple. This behaviour allows saving further space as well as letting the receiver discern when the common ERO is also a source-to-leaf path or not.

Figure 2:
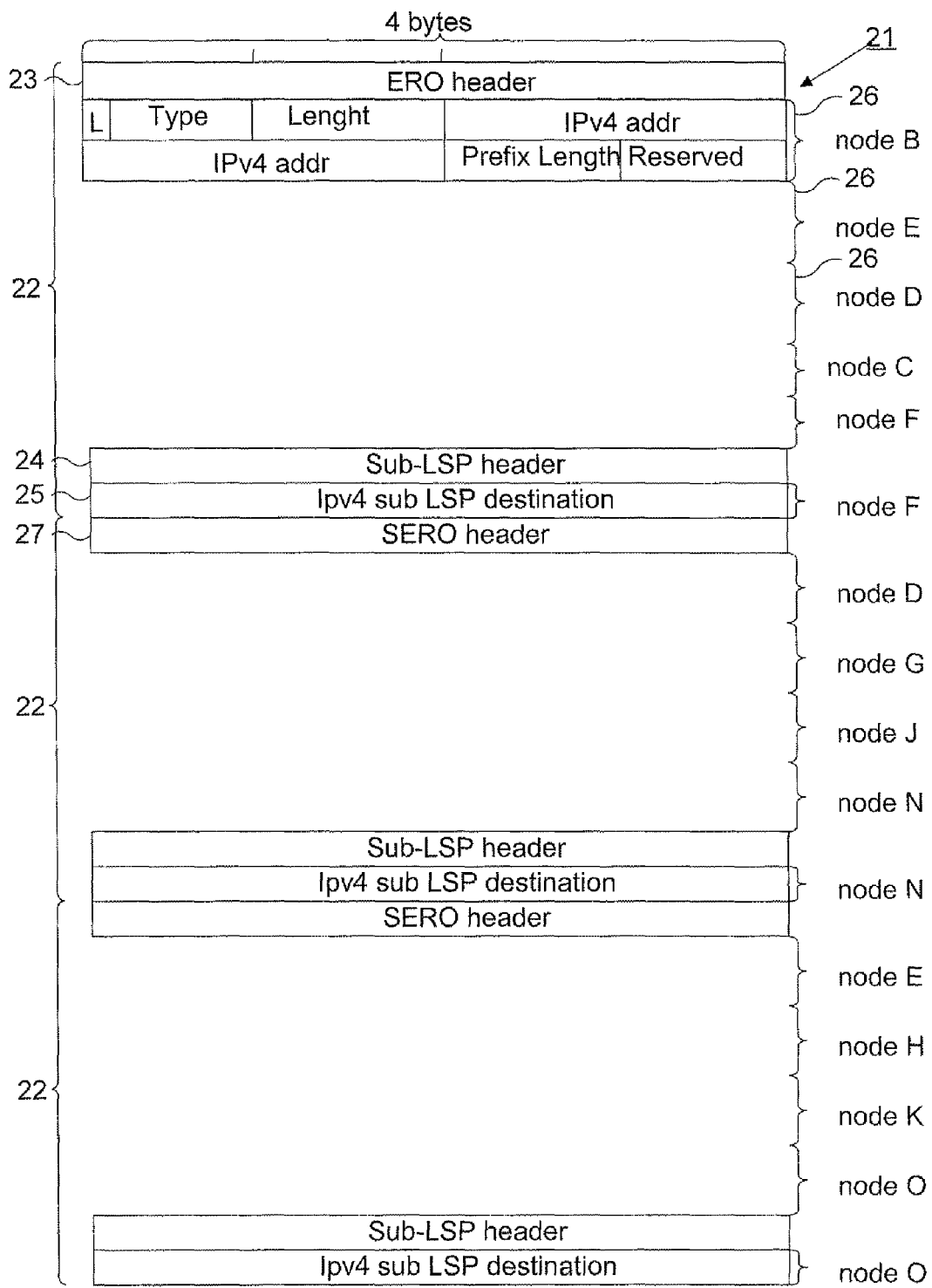
FIG. 2 is a schematic block diagram illustrating a path message in which a point-to-multipoint traffic path is encoded according to a prior art encoding scheme.
Figure 2:
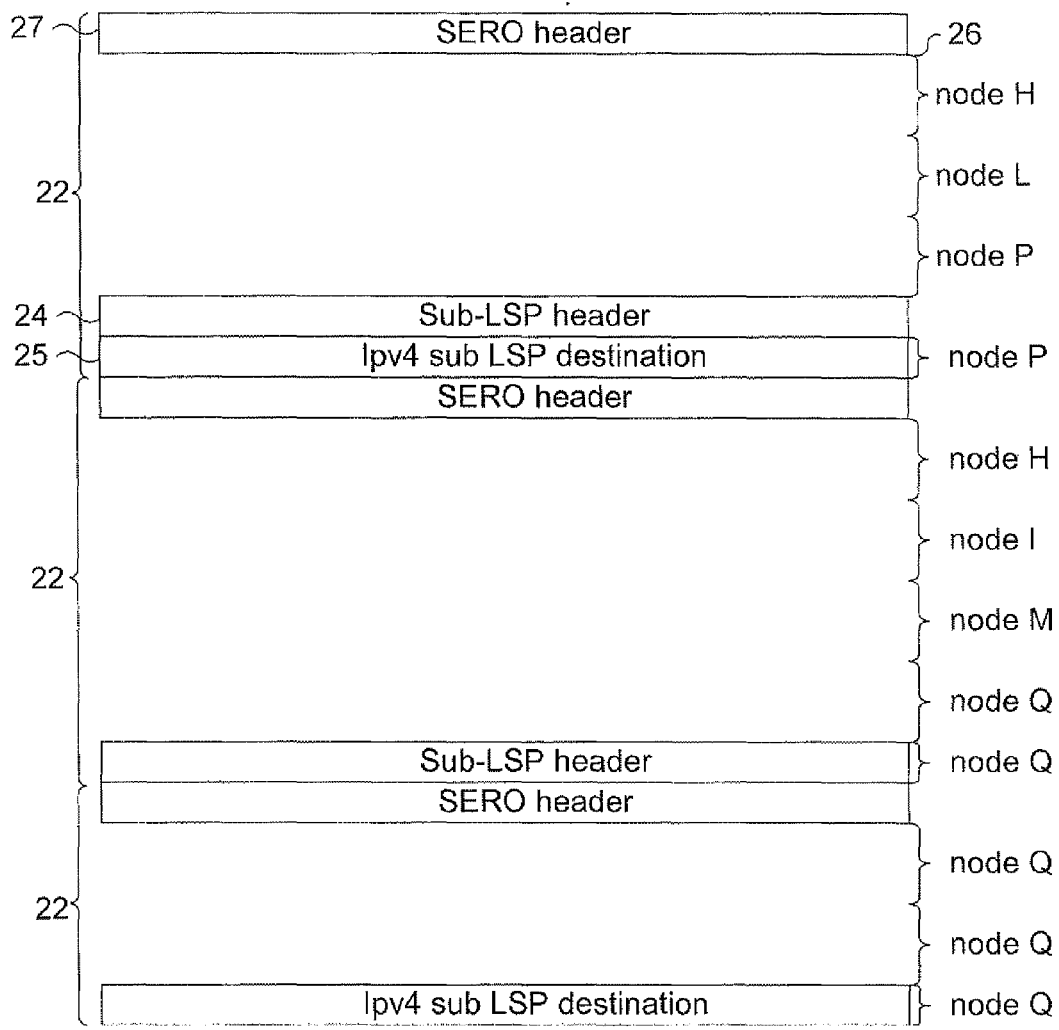

FIG. 2 is a schematic block diagram of a path message 21 that can be sent from node A to node B in FIG. 1 according to the prior art solution described above, while FIG. 3 is a schematic block diagram of the corresponding path message 31 according to the embodiment of the present invention described above.

The path message 21 of FIG. 2 comprises six path descriptors 22. The first path descriptor 22 includes an ERO header 23, a sub-LSP header 24, a sub-LSP destination address 25, which in this case specifies an IPv4 network address to node F of FIG. 1, and a couple of sub objects 26, which in this case includes the network addresses of nodes B, E, D, C and F of FIG. 1. The second path descriptor 22 includes a SERO header 27 instead of the ERO header 23 but is otherwise composed of the same type of message fields as the first path descriptor.

Figure 3:
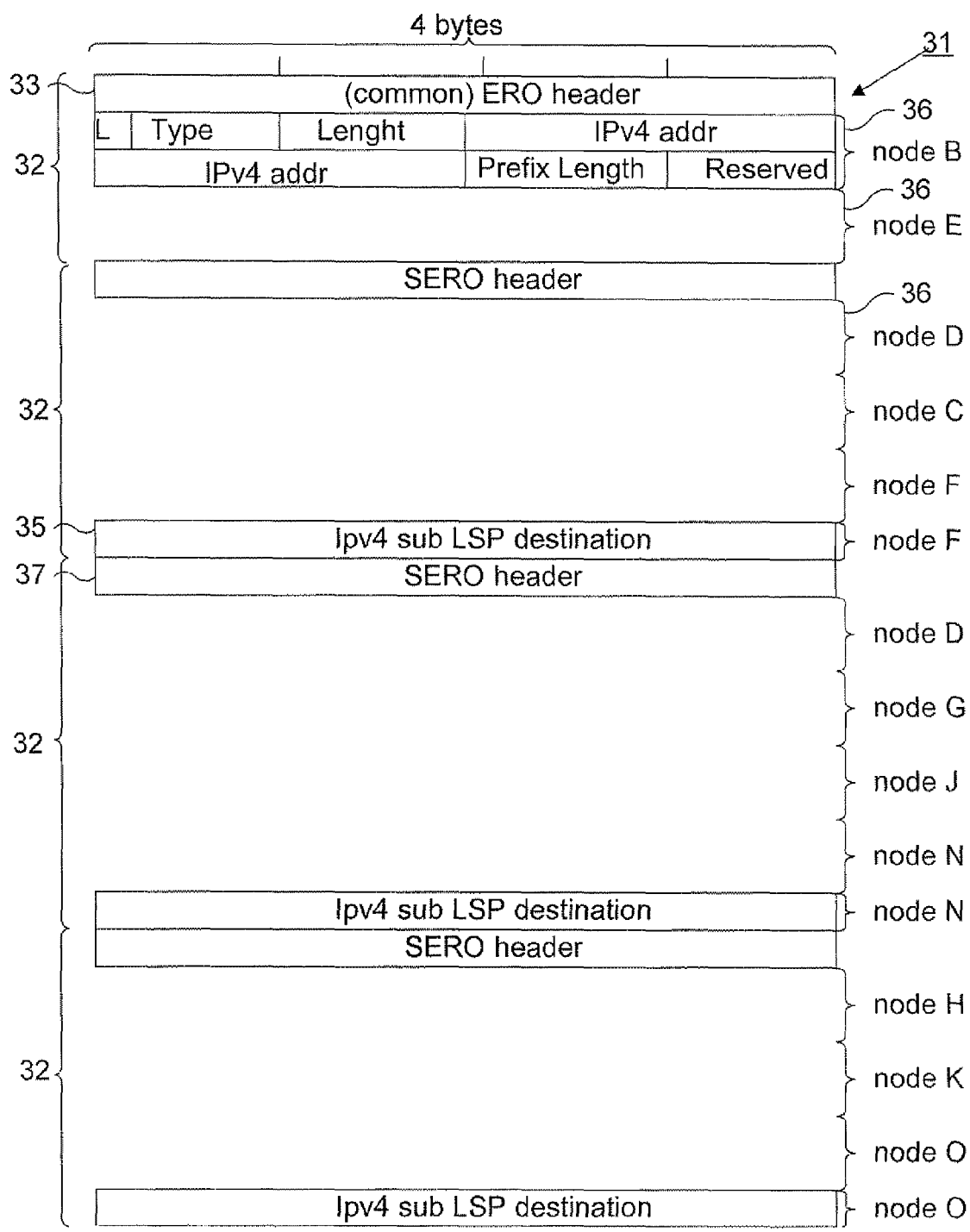
FIG. 3 is a sequence diagram illustrating a path message in which a point-to-multipoint traffic path is encoded by means of an encoding scheme according to an embodiment of the present invention.
Figure 3:
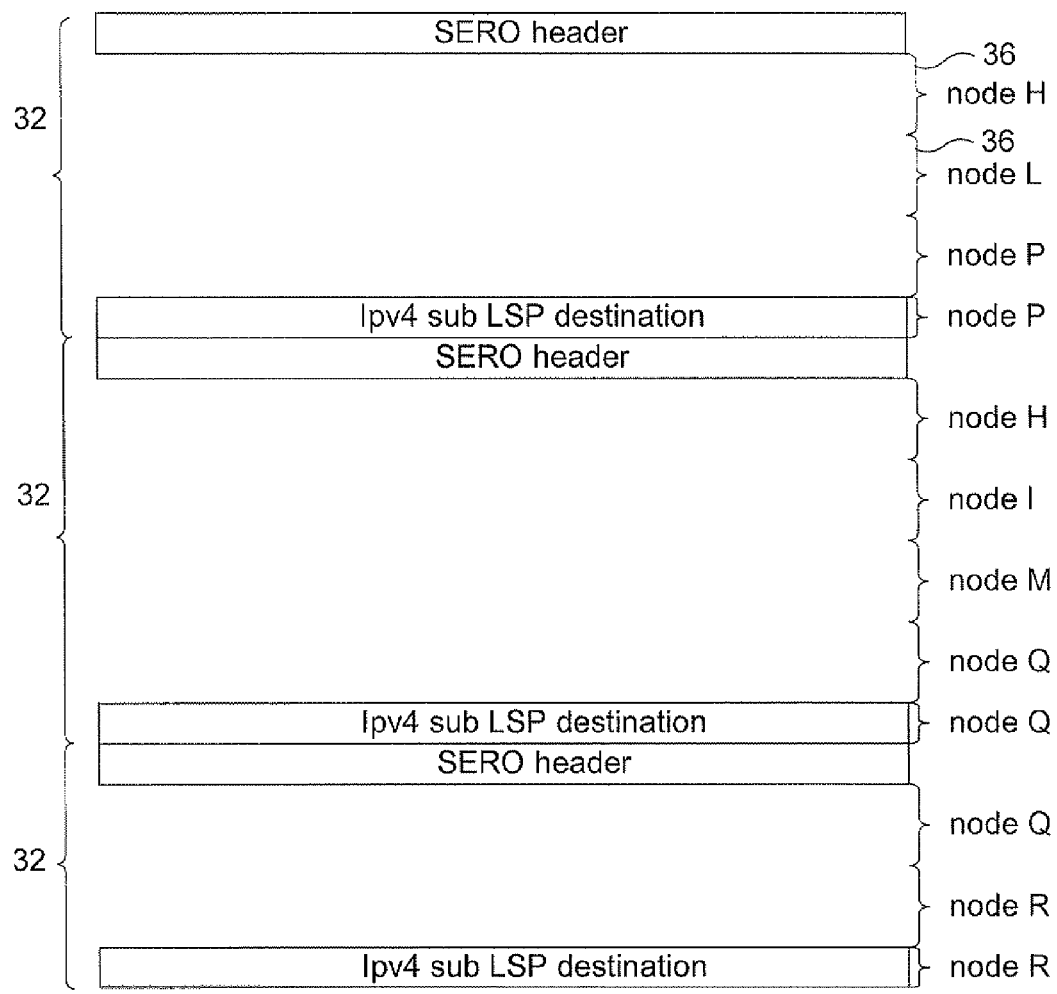

The path message 31 of FIG. 3 comprises seven path descriptors 32. The first path descriptor 32 includes a common ERO header 33 and a couple of node indicators 36, which in this case indicates nodes B and E of FIG. 1. Only the node indicator 36 indicating node B is illustrated in detail in FIG. 3 and is shown to be a sub object including an IPv4 network address of node B as well as 4 bytes of other information. However the present invention is not limited to the use of node indicators 36 that include the actual network addresses of nodes, since the nodes might be identified by means of other types of information. The first path descriptor 32 is here a special case since it does not encode a source-to-leaf sub path but only specifies common nodes as defined above. Therefore the first path descriptor 32 does not include a sub-LSP destination address we will however still refer to it as a path descriptor herein. The second path descriptor 32 includes a SERO header 37, a sub-LSP destination address 35, which in this case specifies an IPv4 network address to node F, and a couple of node indicators 36, which in this case indicates nodes B, E, D, C and F of FIG. 1. In FIG. 3 it is assumed that the node A transmits one path message 31 to node B with all of the path descriptors 32 illustrated in FIG. 3. It however possible that the path descriptors are distributed across a plurality of path messages from node A to node B.

If one would compare the encoding scheme according to the embodiment of the present invention described above with the prior art encoding scheme according to RFC 4875 then the space saved (expressed in bytes) for each path message sent from a branch node can be summarized with the following formula:

saving=(n−1)*(ER−SO)−(ERO header)

where:
n is the number of branches from the branch node;
ER-SO is the size of a sub object 26 as shown in FIG. 2, which is four 4 bytes+sizeof (address) (for instance, if the address scheme used to identify nodes is IPv4 sizeof(address) is 4 bytes and if the address scheme is IPv6 sizeof(address) is 16 bytes); and
ERO header is 4 bytes according to the embodiment described above.

Figure 4:
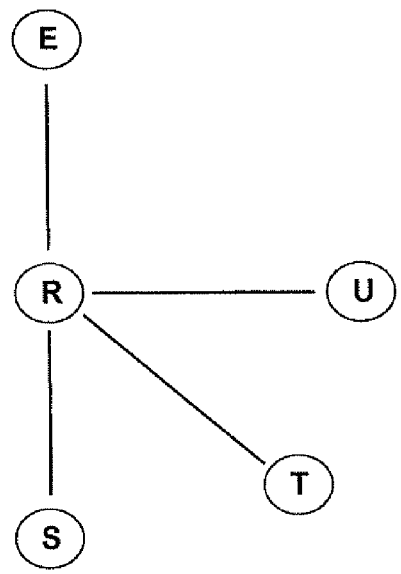
FIG. 4 is a schematic block diagram illustrating a topology of a point-to-multipoint traffic path which can be encoded according to embodiments of the present invention.

In the formula above (n−1)*(ER−SO) is the saving part and (ERO header) is the overhead part. Consider for instance the P2MP path topology shown in FIG. 4 with a branch node R and n=3. Here the total saving would be 12 bytes.

Figure 5:
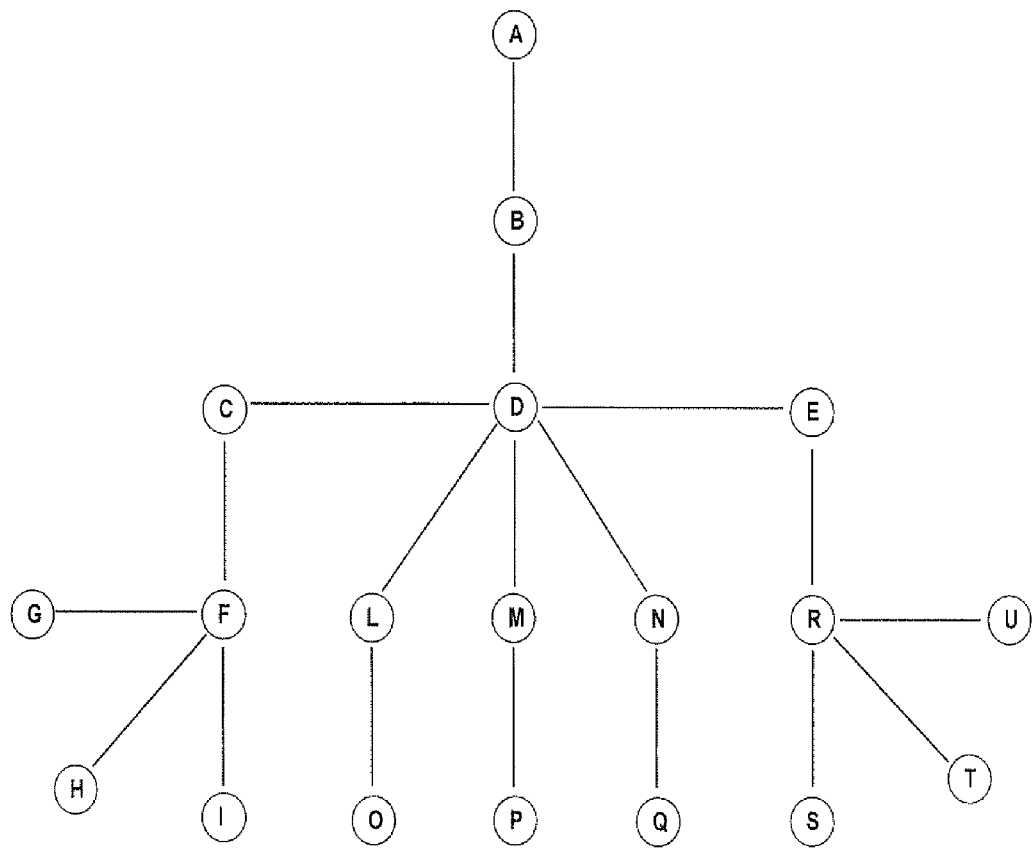
FIG. 5 is a flow chart illustrating is a schematic block diagram illustrating a topology of a point-to-multipoint traffic path which can be encoded according to embodiments of the present invention.

It is worth noting that the overhead introduced by the common ERO is always covered by part of the space saved. This means that this algorithm is always capable to offer a better compression than the one proposed in the RFC 4875. At the same time, the computational complexity continues to be the same as in prior art solution. Obviously the amount of the space saved depends on the topology used. The more complex the topology is, the higher the total space saved. In the above example with a P2MP path topology as shown in FIG. 1 the saving is roughly the 8% in total compared to the RFC 4875 encoding scheme. The corresponding saving with a topology as shown in FIG. 5 would be approximately 23%.

Since P2MP paths in e.g. MPLS or GMPLS networks are set up by means of a distributed routing mechanism in which path messages are propagated down to the different network nodes of the path tree, a new way of encoding the P2MP path will affect the way that path messages are created as well as the way in which path messages should be interpreted. Furthermore network nodes must be adapted to handle the encoding scheme both in terms creating path messages to send and in terms of processing received path messages.

Figure 6:
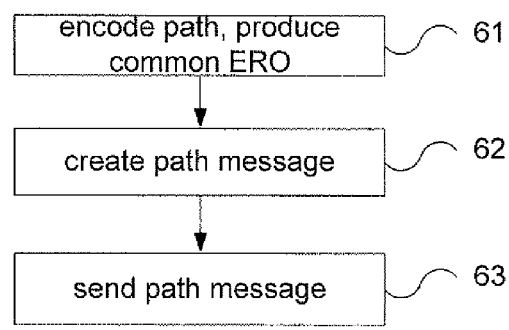
FIG. 6 is a flow chart illustrating an embodiment of the present invention, which is a method in a network node that includes a step of sending a path message.

FIG. 6 is a flow diagram illustrating an embodiment of a method according to the present invention. The method of FIG. 6 is a method for signalling a point to multipoint traffic path and is carried out in a network node that sends a path message. In a step 61, the point-to-multipoint traffic path is encoded and a number of path descriptors are produced. The encoding scheme used includes producing the common explicit route object (ERO) as one of the number of path descriptors. The common ERO specifies a list consisting of network nodes, downlink from the current network node, which every source-to-leaf sub path, traversing the network node that is to receive the path message and belonging to the point-to-multipoint traffic path, should traverse. The path descriptors are then included in one or several path messages created in a step 62. The path message(s) is (are) then sent to the network node that is to receive the path message(s) in a step 63.

Figure 7:
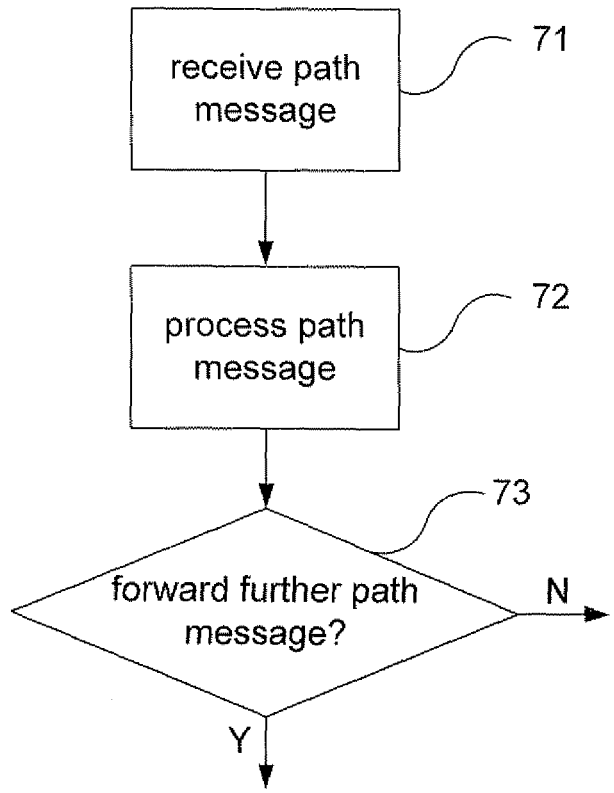
FIG. 7 is a flow chart illustrating an embodiment of the present invention, which is a method in a network node that includes a step of receiving a path message.

FIG. 7 is a flow diagram illustrating another embodiment of a method according to the present invention. The method of FIG. 7 is a method for establishing routing of traffic according to a point-to-multipoint traffic path and is carried out in a network node that receives a path message. In a step 71 one or several path messages are received. The path message(s) is then processed in a step 72. The processing includes interpreting a common explicit route object (ERO). The common ERO specifies a list consisting of network nodes, downlink from the current network node, which every source-to-leaf sub path, traversing the current network node and belonging to the point-to-multipoint traffic path, should traverse. Based on the processing of the path message and the interpretation of the common ERO it is decided in a step 73 whether any further path messages should be forwarded to another network node to enable routing of traffic according to the point-to-multipoint traffic path. If the current network node is an egress node no further path message will be forwarded downlink, but otherwise one or several new path messages could be created and transmitted to other network nodes downlink from the current node. The method of FIG. 6 could then be used when creating and sending any such path message.

Since most network nodes, such as LSRs of a MPLS or GMPLS network would be adapted to both transmit and receive path messages it is natural to adapt a network node to be able to carry out both the method of FIG. 6 and the method of FIG. 7. However since it might be possible for a network node to always be an ingress node or always be an egress node it is also possible that some network nodes would be adapted to only carry out one of the methods.

Figure 8:
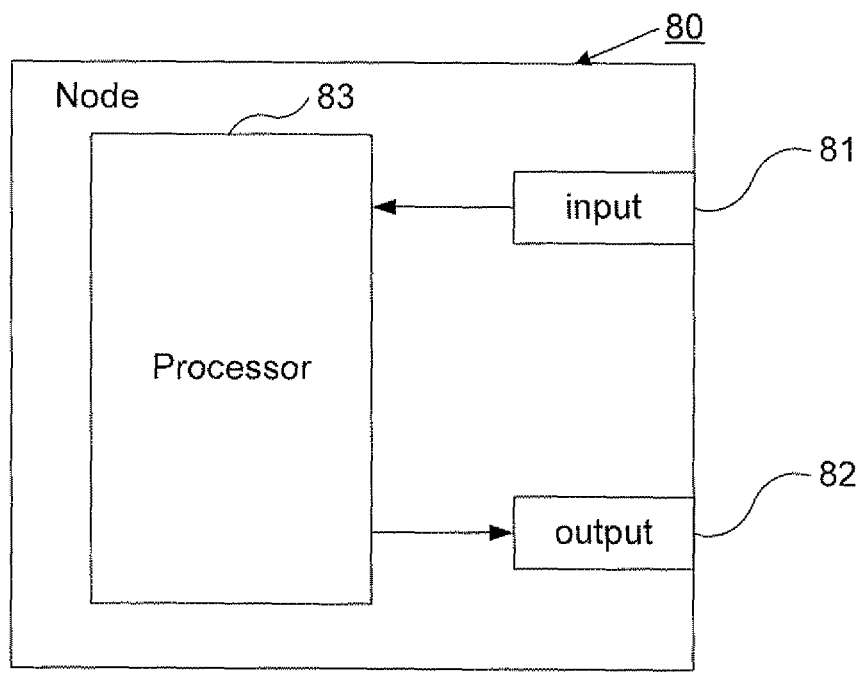
FIG. 8 is a schematic block diagram illustrating a network node according to an embodiment of the present invention.

Embodiments of the present invention also provide network nodes that are adapted to carry out the methods of FIG. 6 and FIG. 7. FIG. 8 is a schematic block diagram illustrating an embodiment of such a network node 80. The network node 80 comprises an input unit 81 which is adapted to receive path messages and an output unit 82 which is adapted to send path messages to other network nodes. The network node 80 also comprises a processor unit 83, which is adapted to encode the point-to-multipoint traffic path using the encoding scheme discussed above and to create path messages based on this encoding scheme and process received path messages that are based on this encoding scheme. Thus the processor unit is adapted to create and process path messages which include a common ERO as described above.

The present invention has been described above by means of description of embodiments of the invention. However there are many modifications that are possible as will be appreciated by the person skilled in the art. The detailed description of an embodiment of the present invention presumed that the path messages followed the syntax according to Resource Reservation Protocol-Traffic Engineered, RSVP-TE, and showed that the common explicit route object was included in an EXPLICIT_ROUTE field of a sub-LSP descriptor. However this is only one example of a possible embodiment of the present invention. Other embodiments of the present invention may rely on a different protocol syntax as will be understood by a person skilled in the art. Implementation of the above mentioned methods according to embodiments of the present invention will require some adaptation of prior art network nodes. Such adaptations will usually only require software adaptations, although implementations that that include adaptations in firmware, hardware or combinations thereof are also feasible.

In the drawings and specification, there have been disclosed typical preferred embodiments of the invention and, although specific terms are employed, they are used in a generic and descriptive sense only and not for purposes of limitation, the scope of the invention being set forth in the following claims.

The invention claimed is:

1. A method in a first network node for signaling a point-to-multipoint traffic path from one ingress node to a plurality of egress nodes in a network, which traffic path includes a plurality of source-to-leaf sub paths, wherein each source-to-leaf sub path is set up between the ingress node and an egress node, the method comprising:
    encoding the point-to-multipoint traffic path using an encoding scheme to produce a number of path descriptors; and
    including the number of path descriptors in at least one path message, sending the at least one path message to at least one second network node to enable routing of traffic according to the point-to-multipoint traffic path,
    wherein the encoding scheme includes producing a common explicit route object as one of the number of path descriptors, wherein the common explicit route object specifies a list consisting of nodes, a downlink from the first network node, that every source-to-leaf sub path traversing the second network node and belonging to the point-to-multipoint traffic path traverse;
    wherein the encoding scheme further comprises producing at least one sub path descriptor, the sub path descriptor specifying a list of nodes, a downlink from the first network node and excluding any node listed in the common explicit mute object, that one of the source-to-leaf sub paths traverses to reach the egress node of that source-to-leaf sub path; and
    wherein the common explicit route object includes a specification of an egress node as a destination address of a source-to-leaf sub path only if the list of the common explicit route object identifies at least the final part of a source-to-leaf sub path.

2. The method of claim 1, wherein the point-to-multipoint traffic path is a Label Switched Path in a Multi-Protocol Label Switching Network or a Generalized Multi-Protocol Label Switching Network.

3. The method of claim 1, wherein the list of the common explicit route object includes network addresses of the nodes in the list.

4. A method in a first network node for signaling a point-to-multipoint traffic path from one ingress node to a plurality of egress nodes in a network, which traffic path includes a plurality of source-to-leaf sub paths, wherein each source-to-leaf sub path is set up between the ingress node and an egress node, the method comprising:
    encoding the point-to-multipoint traffic path using an encoding scheme to produce a number of path descriptors; and
    including the number of path descriptors in at least one path message, sending the at least one path message to at least one second network node to enable routing of traffic according to the point-to-multipoint traffic path,
    wherein the encoding scheme includes producing a common explicit route object as one of the number of path descriptors, wherein the common explicit route object specifics a list consisting of nodes, a downlink from the first network node, that every source-to-leaf sub path traversing the second network node and belonging to the point-to-multipoint traffic path traverse;
    wherein the encoding scheme further comprises producing at least one sub path descriptor, the sub path descriptor specifying a list of nodes, a downlink from the first network node and excluding any node listed in the common explicit route object, that one of the source-to-leaf sub paths traverses to reach the egress node of that source-to-leaf sub path; and
    wherein the at least one path message is a path message according to Resource Reservation Protocol-Traffic Engineered, RSVP-TE, and wherein the common explicit route object is included in an EXPLICIT ROUTE field of a sub-LSP descriptor according to RSVP-TE.

5. A first network node adapted to signal a point-to-multipoint traffic path from one ingress node to a plurality of egress nodes in a network, the traffic, path including a plurality of source-to-leaf sub paths, wherein each source-to-leaf sub path is set up between the ingress node and an egress node, the first network node comprising:
    a processor unit configured to encode the point-to-multipoint traffic path using an encoding scheme to produce a number of path descriptors, and to include the number of path descriptors in at least one path message, and further comprising:
        an output unit configured to send the at least one path message to at least one second network node to enable routing of traffic according to the point-to-multipoint traffic path,
    wherein the encoding scheme is adapted to produce a common explicit route object as one of the number of path descriptors, the common explicit route object specifying a list consisting of nodes, a downlink from the first network node, that every source-to-leaf sub path, traversing the second network node and belonging to the point-to-multipoint traffic path traverses; and
    wherein the encoding scheme is further configured to produce at least one sub path descriptor, the sub path descriptor specifying a list of nodes, a downlink from the first network node and excluding any node listed in the common explicit route object, that one of the source-to-leaf sub paths traverses to reach the egress node of that source-to-leaf sub paths; and wherein the common explicit route object includes a specification of an egress node as destination address of a source-to-leaf sub path only if the list of the common explicit route object identifies at least the final part of a source-to-leaf sub path.

6. The first network node of claim 5, wherein the point-to-multipoint traffic path is a Label Switched. Path in a Multi-Protocol Label Switching Network or a Generalized Multi-Protocol Label Switching Network.

7. The first network node of claim 5, wherein the list of the common explicit route object includes network addresses of the nodes in the list.

8. A. first network node adapted to signal a point-to-multipoint traffic path from one ingress node to a plurality of egress nodes in a network, the traffic path including a plurality of source-to-leaf sub paths, wherein each source-to-leaf sub path is set up between the ingress node and an egress node, the first network node comprising:

a processor unit configured to encode the point-to-multipoint traffic path using an encoding scheme to produce a number of path descriptors, and to include the number of path descriptors in at least one path message, and further comprising:

an output unit configured to send the at least one path message to at least one second network node to enable routing of traffic according to the point-to-multipoint traffic path, wherein the encoding scheme is adapted to produce a common explicit route object as one of the number of path descriptors, the common explicit route object specifying a list consisting of nodes, a downlink from the first network node, that every source-to-leaf sub path, traversing the second network node and belonging to the point-to-multipoint traffic path traverses;

wherein the encoding scheme is further configured to produce at least one sub path descriptor, the sub path descriptor specifying a list of nodes, a downlink from the first network node and excluding any node listed in the common explicit route object, that one of the source-to-leaf sub paths traverses to reach the egress node of that source-to-leaf sub path: and wherein the at least one path message is a path message according to Resource Reservation Protocol- Traffic Engineered, RSVP-TE, and wherein the common explicit route object is included in an EXPLICIT ROUTE field of a sub-LSP descriptor according to RSVP-TE.

* * * * *

UNITED STATES PATENT AND TRADEMARK OFFICE
CERTIFICATE OF CORRECTION

| | | |
|---|---|---|
| PATENT NO. | : 8,923,295 B2 | Page 1 of 1 |
| APPLICATION NO. | : 13/260941 | |
| DATED | : December 30, 2014 | |
| INVENTOR(S) | : Bellagamba et al. | |

It is certified that error appears in the above-identified patent and that said Letters Patent is hereby corrected as shown below:

In the Claims

In Column 11, Line 60, in Claim 1, delete "mute" and insert -- route --, therefor.

In Column 12, Line 43, in Claim 5, delete "traffic, path" and insert -- traffic path --, therefor.

In Column 13, Line 10, in Claim 6, delete "Switched. Path" and insert -- Switched Path --, therefor.

In Column 13, Line 16, in Claim 8, delete "A. first" and insert -- A first --, therefor.

In Column 14, Line 18, in Claim 8, delete "path: and" and insert -- path; and --, therefor.

Signed and Sealed this
Twenty-third Day of February, 2016

Michelle K. Lee
*Director of the United States Patent and Trademark Office*